United States Patent [19]

Soria et al.

[11] Patent Number: 5,066,398

[45] Date of Patent: Nov. 19, 1991

[54] MEMBRANE FOR A FILTRATION, GAS OR LIQUID SEPARATION OR PERVAPORATION APPARATUS AND A MANUFACTURING METHOD FOR SUCH MEMBRANE

[75] Inventors: Raymond Soria, Bazet; Corinne Defalque, Tarbes; Jacques Gillot, Odos, all of France

[73] Assignee: Societe Des Ceramiques Techniques, Bazet, France

[21] Appl. No.: 645,767

[22] Filed: Jan. 25, 1991

[30] Foreign Application Priority Data

Jan. 22, 1991 [FR] France .............................. 91 00679

[51] Int. Cl.$^5$ .............................................. B01D 69/10
[52] U.S. Cl. .............................. 210/321.89; 210/490; 210/500.27
[58] Field of Search ................ 55/16, 158; 210/640, 210/321.89, 490, 500.27, 500.25, 500.26; 427/245, 246

[56] References Cited

U.S. PATENT DOCUMENTS 4,813,983 3/1989 Nohmi et al. ...................... 55/16 X Primary Examiner—Frank Spear
Attorney, Agent, or Firm—Sughrue, Mion, Zinn, Macpeak & Seas

[57] ABSTRACT

A membrane for a filtration, gas or liquid separation or pervaporation apparatus comprising at least one porous layer of an inorganic material selected from sintered ceramic, sintered metal, sintered glass or carbon and a separating layer of organic material, the membrane being characterized in that said organic material is a polyphosphazene, in that the average diameter of the pores in said porous layer of inorganic material is between about 5 nm and 1 μm, and in that said separating layer is continuous and only penetrates into said porous layer to a depth of less than five times the diameter of said pores in said porous inorganic layer, said layers being strongly bonded to each other.

25 Claims, No Drawings

MEMBRANE FOR A FILTRATION, GAS OR LIQUID SEPARATION OR PERVAPORATION APPARATUS AND A MANUFACTURING METHOD FOR SUCH MEMBRANE

The present invention concerns a membrane for a filtration, gas or liquid separation or pervaporation apparatus. Such an apparatus may comprise, for example, a macroporous block (known as aport) of sintered ceramic material, sintered metal, sintered glass or carbon (referred to hereinafter as "inorganic" materials), perforated by one or more parallel longitudinal channels whose surface is covered with a membrane.

Mineral membranes are known which are constituted by an inorganic material, but the separating layer will not retain molecules having a molecular weight of less than about 1 000 daltons in a solvent with a lower molecular weight (200 daltons or less). Further, they will not separate gases by a mechanism which is more selective than the flow molecular weight effect in the KNUDSEN method. On the other hand, this type of membrane has excellent properties as regard temperature rise, chemical attack and large pressure changes.

The use of organic membranes is known in inverse osmosis to retain small molecules (molecular weight lower than 1 000 daltons). Organic membranes are generally mechanically fragile and cannot tolerate a rise in temperature (e.g. during vapor sterilization) or an aggressive medium (eg concentrated acids and bases used during chemical cleaning) at least over the periods of one to several years required of membrane separation installations.

Membranes having a support of inorganic porous material and a separating layer composed of a polymeric resin material have also been proposed.

French patent FR-A-2 575 398 thus describes a filter constituted by a porous ceramic substrate and a microporous membrane of polymeric resin material. This patent proposes that the layer be made from high molecular weight resin material. This layer, wherein the pore diameter is greater than or equal to 0.1 $\mu$m, is partially on the ceramic support layer and partially in the pores of the ceramic support layer, i.e. it partially infiltrates the pores of that layer, reducing the flow performance of the filtration apparatus.

Japanese patent 59/206 008 describes the deposition of a microporous polymeric layer onto a ceramic support. This requires the support's pores to be blocked before the organic layer is deposited, then dissolution of the blocking material following deposition. There are a number of drawbacks to this method of manufacture. Several additional steps are necessary and the layer produced is not perfectly bonded to the ceramic support, leaving it very fragile. Further, elimination of the pore blocking material may damage the layer.

The object of the present invention is to produce a membrane for a filtration apparatus wherein the support layer is inorganic and the separating layer is organic and does not penetrate the pores of the support layer, and further is mechanically stronger than previous organic separating layers.

The present invention consists in a membrane for a filtration, gas or liquid separation or pervaporation apparatus comprising at least one porous layer of an inorganic material selected from sintered ceramic, sintered metal, sintered glass or carbon and a separating layer of organic material, the membrane being characterized in that said organic material is a polyphosphazene, in that the average diameter of the pores in said porous layer of inorganic material is between about 5 nm and 1 $\mu$m, in that said separating layer is continuous and penetrates into said porous layer to a depth of less than five times the value of the diameter of said pores of said porous inorganic layer. It may in certain cases be less than said value.

The thickness of the separating layer may be between 0.1 $\mu$m and 30 $\mu$m, preferably between 1 $\mu$m and 5 $\mu$m.

This thickness is constant to an accuracy of better than 10%, and in some cases to better than 1%, over the whole of said separating layer. The latter is free of defects such as holes, and is solidly attached to the supporting layer, as shown by scanning electron microscope observation of a section through the layers and from tearing tests by pressurizing a liquid impregnating the inorganic porous layer.

The present invention also consists in a membrane apparatus for filtration, separation or pervaporation comprising:

a macroporous block of a material selected from sintered ceramic, sintered metal, sintered glass or carbon, perforated by a plurality of parallel longitudinal channels, wherein the surface is covered by at least one porous layer of inorganic material and a separating layer of organic material, means for introducing a fluid to be purified to a first end of said channels, means for collecting a purified fluid situated at the lateral surface of said block, means for collecting residual fluid at the second end of said channels, characterized in that said porous layer of inorganic material and said porous layer of organic material are conformed as defined above.

Polyphosphazenes are polymeric materials whose chains are constituted by alternating nitrogen and phosphorus atoms linked by alternating single and double bonds. The phosphorus atom may carry two organic substituents, R and R', which may be identical or different.

A linear polyphosphazene is preferably used, wherein the string of phosphorus and nitrogen atoms forms a chain (—N=P—N=P—N=P—N=), the phosphorus atom carrying the two organic substituents R and R'.

Three classes of polyphosphazenes may be used. They are defined according to the substituents R and R' on the phosphorus atom, i.e.:

polyalkoxyphosphazenes, substituents R and R' being alkyl chains linked to the phosphorus by an oxygen atom; poly bis(trifluoroethyoxy)phosphazene is an example of this product type;

polyalkylaminephosphazenes, substituents R and R' being alkyl chains linked to the phosphorus by a nitrogen atom; poly bis(ethylamine)phosphazene and poly bis(butylamine)phosphazene are examples of this product type;

polyaryloxyphosphazenes, substituents R and R' being benzene nuclei with para positioned organic groups, the benzene nuclei being linked to the phosphorus by an oxygen atom. The following non-limiting table shows possible substituents for the para position on the benzene nucleus:

| radical | name |
|---------|------|
| H | hydrogen |

| radical | name |
| --- | --- |
| OH | hydroxy |
| OCH$_3$ | methoxy |
| OC$_6$H$_5$ | phenoxy |
| CH$_3$ | methyl |
| C$_2$H$_5$ | ethyl |
| CH$_2$CH=CH$_2$ | allyl |
| CCl$_3$ | trichloromethyl |
| CF$_3$ | trifluoromethyl |

These products are commercially available, for example as ORGAFLEX ® from ATOCHEM.

The present invention further consists in a process for preparation of a polyphosphazene separating layer on an inorganic porous layer, characterized in that it comprises three stages:

preparation of a solution of polyphosphazene in a solvent for the polymer, depositing the separating layer by applying said solution to the surface of said porous inorganic layer impregnated beforehand with a liquid which does not dissolve the polyphosphazene, drying the polyphosphazene separating layer.

The polyphosphazene may be dissolved in at least one polar solvent selected from the following:

alcohols, for example methanol, ketones, for example acetone or methyl ethyl ketone, esters, for example ethyl acetate, ethers, for example tetrahydrofuran or diethyl ether, aromatic hydrocarbons, for example benzene or toluene.

Dissolution may be carried out by heating or at room temperature depending on the polymer and the solvent, and with agitation.

The polyphosphazene concentration in the solution is one parameter allowing viscosity regulation. With some solvents a concentration of 50% by weight can be obtained. The viscosity can be as high as 200 mPa.s.

In order to prevent penetration of the polymeric solution into the pores of the inorganic porous layer, the surface of said layer intended to receive the separating layer is prepared by impregnating it with a liquid which does not dissolve the polyphosphazene.

By way of example, water, amines such as tripentylamine, nitriles such as acetonitrile, or hydrocarbons such as hexane may be used.

Impregnation may be carried out by any standard means such as soaking or spraying; it may also be achieved by circulation in the channel(s) of a filtration apparatus.

Subsequent deposition of the separating layer is carried out by coating the porous inorganic layer or filling the channels in the case of a multichannel apparatus. The polymeric solution is left in contact with the porous inorganic layer for a specific time period. The polyphosphazene in the solution coagulates and the remaining liquids are removed.

The thickness of the deposited layer is regulated by the contact period and the concentration of the polyphosphazene in solution.

Finally, the separating layer is dried. Since the polyphosphazene coagulates when the layer is formed, solvent and non-dissolving solvent evaporation conditions are not critical. For convenience, water is preferably used as the non-dissolving solvent and a compound which is more volatile than water is preferably used as the solvent.

The characteristics of the polyphosphazene layer according to the invention can be controlled by manipulating the following parameters:

the nature of the polymer and the substituents on the phosphorus atom, the nature of the solvent, the nature of the non-dissolving solvent used in coagulation, the concentration of the polymeric solution, the pore diameter and the characteristics of the porous inorganic support, the deposition conditions for the polyphosphazene layer.

In a first variant of the process, an additive is added to the polyphosphazene solution (in a proportion of less than 10% by weight) to initiate formation of very small pores in the polyphosphazene layer. This additive is called a porogen. Organic compounds such as PEG (polyethylene glycol), polyvinylpyrrolidones, cellulose derivatives or glycerine may be used for this purpose.

The polyphosphazene layer is deposited using the technique described above. During deposition of the membrane, the coagulating polyphosphazene embodies the porogen. The latter form inclusions in the polyphosphazene layer. Following drying of the polyphosphazene layer, the porogens are eliminated by washing, thus producing micropores. The nature and size of the porogen compound influences the characteristics of the polyphosphazene layer thus obtained.

In a second variant of the process, a polyphosphazene having a structure permitting reticulation is used. Thus a polyaryloxyphosphazene could be used which comprises, as well as the R and R' substituents, benzene nuclei bonded to phosphorus via an oxygen atom and themselves carrying an unsaturated chain, for example vinyl, allyl or butenyl. A polyaryloxyphosphazene may also be used as the polyphosphazene wherein said R and R' substituents are constituted by phenoxy groups having para positioned organic groups with labile hydrogen atoms, such as OH type groups. A reticulating agent such as a peroxide is added to the polyphosphazene solution. The peroxides most commonly used for reticulation are benzoyl peroxide, 2,2-bis(tert-butylperoxy)-butane, terbutylcumyl peroxide, 2,5-dimethyl-2,5-bis(-terbutylperoxy)hexane or isopropyl and peroxy-tert-butyl carbonate. This list is not exhaustive.

These products are preferably used at a concentration of less than 5% by weight with respect to polyphosphazene in the polymer solution. The polyphosphazene layer is deposited using the basic technique described above. Following drying of the layer, reticulation is effected by firing wherein the polyphosphazene chains cross link. The reticulation conditions (time and temperature) are a function of the nature and concentration of the peroxide. The fixing conditions influence the characteristics of the polyphosphazene layer obtained.

In a third variant of the process, a polyphosphazene solution containing a reticulation agent and an organic porogenic compound at the same time may be used. The layer is prepared as described above. The process then comprises elimination of the porogen and reticulation firing—the washing stage may be carried out before or after firing.

In a fourth variant of the process defined above applied to a multichannel microporous block, the ends of the porous inorganic support block are dried before deposition of the polyphosphazene layer. After impregnation by the non-dissolving solvent, each end of the support is dried over a length of several millimeters to several centimeters. Drying is carried out using standard techniques, for example using an annular oven, infrared lamp, blown air, etc, after which the polymeric layer is deposited. The polymeric solution penetrates the dried portion of the porous inorganic support. This technique allows the polyphosphazene to coagulate in the extremities of the porous inorganic support and to infiltrate totally the porous structure. This reduces or eliminates losses of the fluid to be treated as the result of passing directly from the upstream end of the membrane to the downstream end, crossing the greater porosity of the porous inorganic support.

This variant of the process may be combined with any of the three preceding variants.

Further characteristics and advantages of the present invention will be apparent from the following description of various non-limiting embodiments which are given by way of non-limiting example only.

EXAMPLE 1

A prismatic porous ceramic block pierced by 19 channels with a diameter of 4mm was used as a support. The surface of each channel was covered with a porous ceramic layer having an average pore diameter of 0.2 micron. This support was placed in a bath containing tripentylamine for two hours to impregnate the support's pores.

A polyphosphazene solution containing the following was prepared in a water bath at about 60° C.:
 50% by weight methanol,
 50% by weight poly bis(trifluoroethoxy)phosphazene.

The solution was cooled, filtered through a nylon sieve (mesh size 10 microns), and then degassed.

Immediately following impregnation of the support with tripentylamine, the layer was deposited by filling the channels in the porous ceramic block with the solution of poly bis(trifluoroethoxy)phosphazene in methanol. The solution was left in the channels in the support for five minutes (the polyphosphazene coagulates during this period). After this the channels in the support block were emptied. The coagulated polyphosphazene layer was dried at 40° C. for 24 hours.

Scanning electron microscope observation of the poly bis(trifluoroethoxy)phosphazene layers showed that the polymer had not infiltrated more than 0.1 $\mu$m into the pores of the porous ceramic layer on which the polyphosphazene layer was deposited. It also showed that its thickness of 30 microns was constant. The bond between the ceramic and polyphosphazene layers was strong. A standard tearing test, carried out by putting the layer under pressure, could not dislodge the layer. The test consisted in pushing a liquid mass from the pores of the porous ceramic support towards the polyphosphazene layer. It is described in detail in the article "Microfiltration tangentielle avec decolmatage sur membranes ceramiques" by S. GALAJ, A. WHICKER, J. P. DUMAS, J. GILLOT, D. GARCERA; Le Lait 64 (1984) 129-140.

EXAMPLE 2

A sintered metal porous tube with an average pore diameter of 1 micron was soaked for 30 minutes in a bath containing acetonitrile to fill its pores with the liquid.

A solution of polyphosphazene was prepared by dissolving 20 g poly bis(ethylamine)phosphazene in 80 g toluene to give a solution containing:
 20 weight % poly bis(ethylamine)phosphazene,
 40 weight % toluene,
 40 weight % xylene.

After dissolution the solution was filtered through a nylon sieve (mesh size 10 microns) and then degassed.

The ends of the sintered metal tube which had been freshly impregnated with acetonitrile were dried over a one centimeter distance using warm air. The layer was deposited as follows: the channel formed by the sintered metal tube was filled with the polyphosphazene solution in the toluene/xylene mixture. The channel was kept full for 30 seconds then emptied. The polyphosphazene layer was dried for 48 hours at room temperature in a ventilated room.

Scanning electron microscope observation of the polyphosphazene layer revealed a continuous layer. The thickness of the layer, measured by observation of a section, was 5 microns. No penetration of the polyphosphazene layer into the sintered metal support was observed with the exception of the ends of the sintered metal tube which were totally impregnated by the poly bis(ethylamine)phosphazene, thus eliminating any risk of short-circuiting the fluid to be treated.

EXAMPLE 3

A pump was used to circulate hexane in the channel of a porous carbon tube with an internal diameter of 6 mm covered with a porous ceramic layer having pores with an average diameter of 800 nm. The hexane completely filled the pores of the ceramic tube over a period of half an hour.

A solution of poly bis(p-hydroxyphenoxy)phosphazene was prepared by dissolving 5 g of the polymer in 95 g ethyl acetate in a water bath at 40° C. to give a solution containing:
 5 weight % poly bis(p-hydroxyphenoxy)phosphazene,
 95 weight % ethylacetate.

After cooling a reticulating agent was added: 1.5% bis-2,2-(tert-butylperoxy)butane with respect to the polyphosphazene. This product is a reticulating agent for polyphosphazenes and has labile hydrogen. The solution was filtered through a nylon sieve (mesh size 10 microns) and then degassed.

The polyphosphazene layer was deposited on the freshly impregnated tube. The channel formed by the tube was filled with the polyphosphazene solution then emptied after a period of 2 seconds. The polyphosphazene layer was dried at 40° C. for 48 hours.

After drying, the layer was reticulated by firing for one hour at 160° C. The polyphosphazene layer was studied by scanning electron microscopy. The layer surface was free of defects; the observed thickness of a section was 1 micron, this thickness being constant over the entire length of the tube. A mechanical strength test was carried out by pressurizing liquid across the pores towards the polyphosphazene layer. The polyphosphazene layer was not disrupted by this type of test.

EXAMPLE 4

A porous ceramic block as described in example 1 with the internal surface of the channels covered by a porous ceramic layer with an average pore diameter of 50 nm was impregnated with water by immersion in a bath for a period of 2 hours. The pores of the block were completely filled.

A polyphosphazene solution was prepared by dissolving a polyaryloxyphosphazene in methylethylketone at 60° C. The solution had the following composition:

10 weight % poly(p-ethylphenoxy, p-ethylphenoxy, o-allylphenoxy), polyphosphazene,
90 weight % methylethylketone.

The o-allylphenoxy group represents about 10% of the polyphosphazene groups.

After cooling the solution a reticulating agent is added: 3% tert-butylcumyl peroxide by weight with respect to polyphosphazene. The solution was filtered through a nylon sieve (mesh size 10 microns) and then degassed.

The polyphosphazene layer was deposited on the support immediately following water impregnation by filling the channels of the porous ceramic block with the polyphosphazene solution. Contact time was 15 seconds, after which the channels were emptied. The coagulated polyphosphazene layer was dried for 24 hours at room temperature.

Following drying, the polyphosphazene layer was reticulated by firing at 180° C. for 30 minutes.

The polyphosphazene layer was securely bonded to the ceramic support. The tearing test described in example 1 did not damage the layer. The thickness measured by scanning electron microscopy was 8 microns and no infiltration of the polyphosphazene layer into the pores of the support layer was observed.

EXAMPLE 5

A glass tube having an internal diameter of 4 mm and average pore diameter of 5 nm was impregnated with pentane by immersion in a bath for 3 hours.

A solution of poly bis(p-trifluoromethylphenoxy)phosphazene was prepared by dissolving 5 g thereof in a mixture of 60 g n-propanol and 35 g ethyl ether.

Following dissolution, 0.5 g polyethylene glycol having a molecular weight of 400 daltons was added.

The layer was deposited on the freshly impregnated support using the technique described in example 1. Contact time was 1 minute.

After drying (24 hours at room temperature), the polyphosphazene layer was washed with water to eliminate the polyethyleneglycol and produce microporosity.

The tearing test described in example 1 did not damage the layer. Scanning electron microscopy of a section through the layers showed a continuous layer which did not infiltrate the pores of the support, with a homogeneous thickness of 8 microns along the entire length of the glass tube.

EXAMPLE 6

A porous ceramic tube having an internal diameter of 15 mm covered with several layers of porous ceramic with an average pore diameter in the surface layer of 20 nm was impregnated with n-butylamine by circulating the solvent in the channel by means of a pump for 15 minutes.

A solution of poly bis(ethylphenoxy)phosphazene in acetone was prepared, and a porogen compound, polyvinylpyrrolidone (molecular weight 1 000 daltons), was added thereto to give a solution with the following composition:

14 weight % poly bis(ethylphenoxy)phosphazene,
1 weight % polyvinylpyrrolidone,
85% acetone.

One centimeter at the end of the tube was dried using an annular oven, without drying all of the tube. The layer was deposited using the technique described in example 1, with a contact time of two minutes. After emptying, the layer was dried for 36 hours at 35° C.

After drying, the layer was washed with water to eliminate the porogen. Elimination occurred when filtering the water.

The layers were examined using scanning electron microscopy. The layer surface had no defects and the thickness of a section was 12 microns over the entire length of the tube. The scanning electron microscope examination did not reveal any penetration of the polyphosphazenes into the pores of the support except at the ends thereof where the pores were filled with polyphosphazene. This eliminates the risk of communication of the upstream chamber containing fluid to be purified with the downstream chamber. Further, a mechanical test carried out as described in example 1 did not appear to separate the layer.

EXAMPLE 7

A porous ceramic block as described in example 1 with the internal surface of the channels covered with a porous ceramic layer with an average pore diameter of 100 nm was immersed in a bath of water for two hours to impregnate it. A 5 mm length at the end was dried using a current of warm air.

A solution of poly(p-ethylphenoxy,p-hydroxyphenoxy)phosphazene was prepared by dissolving the polymer in a mixture of methyl ketone and ethyl acetate, giving the following composition:

10 weight % poly(p-ethylphenoxy,p-hydroxyphenoxy)phosphazene,
44.5 weight % methyl ethyl ketone,
44.5 weight% ethyl acetate,
1.0 weight % bis-2,2-(tert-butylperoxy)butane.

The latter compound is a reticulating agent for polyphosphazenes, with labile hydrogen.

The polyphosphazene layer was deposited using the technique described in example 1, the contact time being 1.30 minutes. After emptying the channels, the layer was dried at room temperature for 24 hours. Reticulation of the polymer was effected by firing at 160° C. for one hour.

The polyphosphazene layer was characterized by its resistance to the tearing test described in example 1. Scanning electron microscope observation of a section through the layers showed there to be no penetration of the polymeric layer into the ceramic layer. Further, the layer thickness was constant and homogeneous at 10 microns.

EXAMPLE 8

A ceramic tube as described in example 6 with an average diameter of the pores in the surface layer of 50 nm was impregnated with water by circulating water through it using a pump. Two centimeters of the end of the tube was dried using an annular oven.

A solution containing a polyallylaryloxyphosphazene, a peroxide as reticulating agent and glycerine as a porogen was prepared having the following composition:

12 weight% poly bis(allylphenoxy)phosphazene,
1 weight% 2,5-dimethyl-2,5-bis(terbutylperoxy)hexane, 3 weight % glycerine,
84 weight % tetrahydrofuran.

The polyphosphazene layer was deposited using the technique described in example 1, the contact time being 30 seconds. After emptying the channels, the layer was dried at 30° C. for 24 hours.

The polyphosphazene was then reticulated by firing at 150° C. for 2 hours. After cooling, the porogen was eliminated by filtering with water to wash the organic layer. (The order of these two operations may be reversed).

The separating layer was observed by scanning electron microscopy. The section thickness was 3 microns, constant and homogeneous. There was no evidence of penetration except at the ends of the ceramic tube. Prior drying of the tube ends allowed the polymer to fill the pores at the ends.

The invention is not limited by the examples described above. Any means may be replaced by any equivalent means without departing from the scope of the invention.

We claim:

1. A membrane for a filtration, gas or liquid separation or pervaporation apparatus comprising at least one porous layer of an inorganic material selected from sintered ceramic, sintered metal, sintered glass or carbon and a separating layer of organic material, the membrane being characterized in that said organic material is a polyphosphazene, in that the average diameter of the pores in said porous layer of inorganic material is between about 5 nm and 1 μm, and in that said separating layer is continuous and only penetrates into said porous layer to a depth of less than five times the diameter of said pores in said porous inorganic layer, said layers being strongly bonded to each other.

2. A membrane according to claim 1, characterized in that said separating layer only penetrates into said inorganic layer to a depth of less than the diameter of said pores in said inorganic layer, said layers being strongly bonded to each other.

3. A membrane according to claim 1, characterized in that the thickness of said layer is between 0.1 μm and 30 μm.

4. A membrane according to claim 3, characterized in that the thickness of said layer is between 1 μm and 5 μm.

5. A membrane according to claim 1, characterized in that the thickness of said continuous separating layer is constant to better than 10 per cent over its entire area.

6. A membrane according to claim 5, characterized in that the thickness of said continuous separating layer is constant to better than 1 per cent.

7. A membrane according to claim 1, characterized in that said polyphosphazene is linear, wherein the phosphorus and nitrogen atoms form a chain, each phosphorus atom carrying two organic substituents R and R'.

8. A membrane according to claim 7, characterized in that said polyphosphazene is a polyalkyloxyphosphazene and said substituents R and R' are alkyl chains bonded to the phosphorus by an oxygen atom.

9. A membrane according to claim 8, characterized in that said polyphosphazene is poly bis(trifluoroethoxy)-phosphazene.

10. A membrane according to claim 7, characterized in that said polyphosphazene is a polyalkylaminephosphazene and said substituents R and R', are alkyl chains bonded to the phosphorus by a nitrogen atom.

11. A membrane according to claim 10, characterized in that said polyphosphazene is selected from poly bis(ethylamine)phosphazene and poly bis(butylamine)phosphazene.

12. A membrane according to claim 7, characterized in that said polyphosphazene is a polyaryloxyphosphazene and said substituents R and R' are benzene nuclei having para positioned organic groups, said benzene nuclei being bonded to the phosphorus by an oxygen atom.

13. A membrane according to claim 12, characterized in that said para positioned organic groups are selected from hydrogen, hydroxy, methoxy, phenoxy, methyl, ethyl, allyl, trichloroethyl, and trifluoromethyl.

14. A membrane apparatus for filtration, separation or pervaporation comprising:
    a macroporous block of a material selected from sintered ceramic, sintered metal, sintered glass or carbon, perforated by a plurality of parallel longitudinal channels, wherein the surface is covered by a membrane,
    means for introducing a fluid to be purified to a first end of said channels,
    means for collecting a purified fluid situated at the lateral surface of said block,
    means for collecting residual fluid at the second end of said channels,
    the apparatus being characterized in that said membrane is as defined in any one of claims 1 to 13.

15. A process for the preparation of a membrane according to claim 1, characterized in that it comprises three stages:
    preparation of a solution of polyphosphazene using at least one solvent therefor,
    depositing said separating layer by applying said solution to said porous inorganic layer which has been impregnated beforehand with a liquid which does not dissolve the polyphosphazene,
    drying said separating layer.

16. A process according to claim 15, characterized in that said polyphosphazene is dissolved in at least one solvent selected from alcohols, ketones, esters, ethers and aromatic hydrocarbons.

17. A process according to claim 15 characterized in that said liquid which does not dissolve the polyphosphazene and with which said porous inorganic layer is impregnated is selected from water, amines, nitriles and hydrocarbons.

18. A process according to claim 15, characterized in that a porogen is added to said solution of polyphosphazene in a proportion of less than 10% by weight, the porogen being selected from polyethylene glycols, polyvinylpyrrolidones, cellulose derivatives and glycerine derivatives, said porogen being eliminated during an additional washing stage.

19. A process according to claim 15 characterized in that, when the polyphosphazene has a structure permitting reticulation, a reticulating agent is added to said solution in a proportion of less than 5% by weight and the drying stage is followed by firing to effect reticulation.

20. A process according to claim 19, characterized in that the polyphosphazene is a polyaryloxyphosphazene and the substituents R and R' are benzene nuclei bonded to the phosphorus by an oxygen atom, the benzene nuclei carrying organic groups at the para position, the groups being selected from hydrogen, hydroxy, methoxy, phenoxy, methyl, ethyl, allyl, trichloromethyl and trifluoromethyl, said polyaryloxyphosphazene also comprising in addition to said substituents R and R' benzene nuclei bonded to the phosphorus by an oxygen atom and themselves carrying an unsaturated chain.

21. A process according to claim 19, characterized in that said unsaturated chain possesses either a vinyl, allyl or butenyl group.

22. A process according to claim 19, characterized in that said polyphosphazene is a polyaryloxyphosphazene and said substituents R and R' are phenoxy groups possessing para positioned organic groups possessing labile hydrogen.

23. A process according to claim 22, characterized in that said groups are hydroxyl groups.

24. A process according to claim 19, characterized in that said reticulating agent is a peroxide selected from benzoyl peroxide, 2,2-bis(tertbutylperoxy)butane, terbutylcumyl peroxide, 2,5-dimethyl-2,5-bis(terbutylperoxy)hexane, and isopropyl and peroxyterbutyl carbonate.

25. A process according to claim 15, applicable to a multichannel membrane type apparatus, characterized in that, before deposition of said separating layer on the interior of the channels, the ends of the channels which have been impregnated beforehand with said liquid which does not dissolve the polyphosphazene are dried in order to allow the polyphosphazene solution to penetrate them during deposition.

* * * * *